United States Patent [19]

Austad

[11] Patent Number: 5,009,025
[45] Date of Patent: Apr. 23, 1991

[54] QUICK TIE DEVICE

[76] Inventor: Grover R. Austad, 101 Riverview C, Great Falls, Mont. 59404

[21] Appl. No.: 396,801

[22] Filed: Aug. 21, 1989

Related U.S. Application Data

[63] Continuation-in-part of Ser. No. 190,345, May 5, 1988, abandoned.

[51] Int. Cl.⁵ ............................................. A01K 91/00
[52] U.S. Cl. ............................................. 43/44.83
[58] Field of Search ................ 43/44.95, 44.83, 42.25, 43/44.94

[56] References Cited

U.S. PATENT DOCUMENTS

| | | | |
|---|---|---|---|
| 103,645 | 5/1870 | Muscroft | 43/44.83 |
| 1,152,755 | 9/1915 | Perron | 43/44.94 |
| 2,984,882 | 5/1961 | Winn | 43/44.83 |
| 3,293,791 | 12/1966 | Hinkson | 43/42.49 |
| 3,724,119 | 4/1973 | Putman | 43/42.25 |
| 3,848,354 | 11/1974 | Austad et al. | 43/42.25 |
| 4,023,301 | 5/1977 | Warner | 43/42.25 |
| 4,060,927 | 12/1977 | Haun et al. | 43/44.94 |

FOREIGN PATENT DOCUMENTS

| | | | |
|---|---|---|---|
| 641085 | 5/1962 | Canada | 43/44.83 |
| 784447 | 7/1935 | France | 43/44.94 |
| 934611 | 10/1946 | France | 43/44.94 |
| 361078 | 10/1931 | United Kingdom | 43/44.94 |
| 2030032 | 4/1980 | United Kingdom | 43/44.83 |

Primary Examiner—Kurt Rowan

[57] ABSTRACT

An improved quick tie device for providing single direction wrapping during attachment of a line comprising an elongate body formed of wire or the like and to which a line is to be connected, a post (which may be a loop) extends outwardly from the body centrally thereof and a helix formed at an end of the body a spaced distance from the post.

1 Claim, 1 Drawing Sheet

QUICK TIE DEVICE

BRIEF DESCRIPTION

This is a CIP of Ser. No. 190,345, filed May 5, 1988, now abandoned.

FIELD OF THE INVENTION

This invention relates to line attachment devices.

PRIOR ART

The common method of attaching a lure, hook, fly, swivel or other fishing device to a fishing line or leader is the conventional know. Today, as in the past, the fishing devices are tied to the line and when it is necessary to remove the device the line is cut. A certain skill is required to properly tie a know that will not release and even an experienced fisherman will require more time in trying a device to a line than he desires. Some people, because of advancing age or infirmities may not be able to tie the knows required and, as a result must rely on others or even give up the great sport of fishing.

U.S. Pat. No. 2,315,575, discloses a fly or lure detachably attached to a line that was developed by the present inventor. The patent shows a hook having an eyelet end tied to a leader and arranged with a special lure or fly having a closed eyelet in its center body portion, and an open eyelet formed at one end. The hook is attached to the lure or fly by feeding the hook, barbed end first, through the closed eyelet, pushing and rotating the hook therethrough until the leader is positioned alongside the open eyelet, whereat the leader is pulled between the open eyelet loop and the loop shank, to thread the leader therethrough. This arrangement allows a number fo lures or flies to be sequentially attached to a single hook that, more or less, is permanently tied to the end of a leader.

In U.S. Pat. No. 3,848,354, the present inventor, as a co-inventer, discloses a quick tie eye consisting of a body on which are arranged an upstanding post and an open eyelet arrangement around and through which post and open eyelet, respectively, a leader is wrapped to secure the leader thereto. While the quick tie eye disclosed in the patent is effective for use in attaching fishing devices to a line and provides a means of attachement that is much simpler and more easily manipulated that the common knot attachment, it requires an initial wrapping procedure and then a reverse wrapping to provide securement. With a reverse winding one winding direction often becomes awkward for the user, whether the user is normally right-handed or left-handed.

SUMMARY OF THE INVENTION

Objects of the Invention

Principal objects of the present invention are to provide an improved quick eye tie that permits line attachment by winding of a line in a single winding direction.

Other objects are to provide a quick tie device that can be made in varying sizes for use with fishing line, cord, rope or other tie stands.

Another object of the invention is to provide an attachment device that will allow a streamer fly or other device to be attached along the line ahead of another lure, without tying a knot and without any significant loss in breaking strength of the line. This in contrast to knot in monofilament line that will reduce the breaking strength of the line by up to forty percent.

Features of the Invention

Principal features of the invention include a strong wire or plastic form that is formed almost double to create a closed loop and two generally parallel shanks. One of the shanks is formed with an open loop, and with an end thereof formed in a substantially 90° angle to serve as a post. The end of the other shank is formed as a helix.

An alternative embodiment of the present invention comprises a length of strong wire that has a helix would at each end and a center portion that is bent to form a loop that serves as a post. The amount of interior space in the loops varies with the particular application.

Other objects and features of the invention will become apparent from the following detailed description and drawing disclosing what are presently contemplated as being the best mode of the invention.

THE DRAWING

Figure 2:
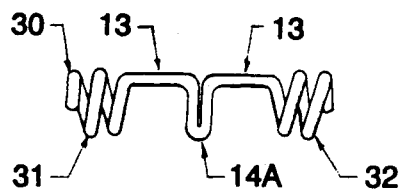
Figure 3:
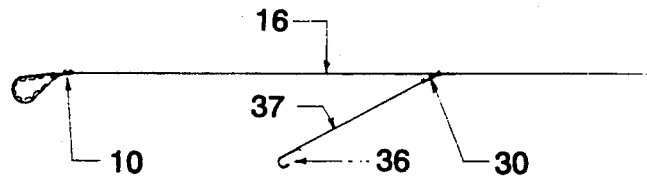
Figure 4:
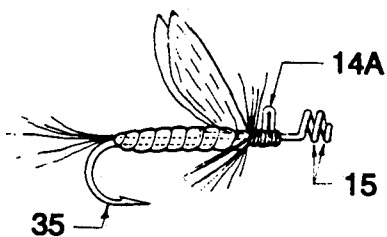

FIG. 2, a side elevation view of an alternative embodiment of the invention;

FIG. 3, a side view of use of FIG. 2 on a snelled hook;

FIG. 4, a view showing embodiment of invention on a fishing fly.

Figure 4A:
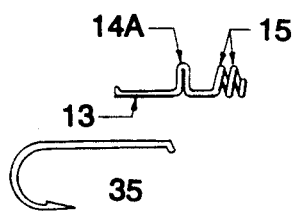

FIG. 4A shows side view of the major components of FIG. 4.

Figure 5:
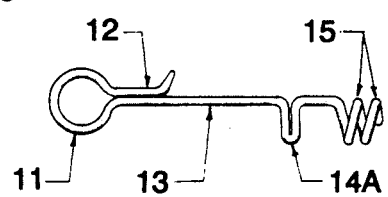

FIG. 5 shows a side elevation view of another alternative embodiment, and

Figure 6:
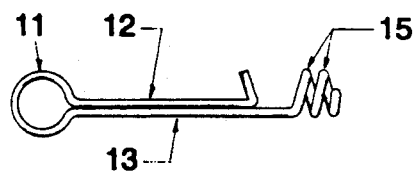
Figure 6A:
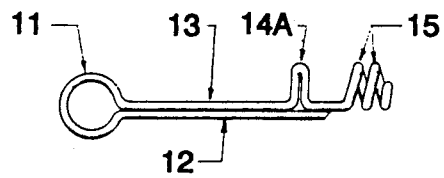
Figure 7:
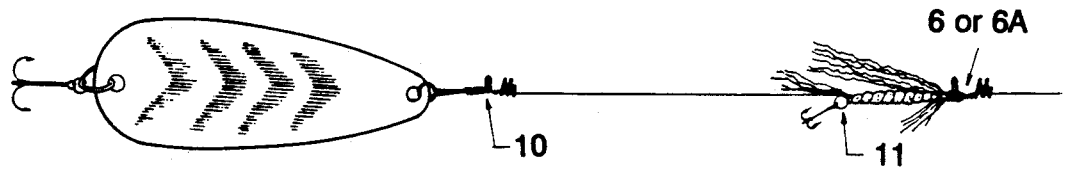

FIGS. 6 and 6A show alternate embodiments of the invention to construct the teaser streamer fly shown ahead of an action lure as is depicted in FIG. 7.

DETAILED DESCRIPTION

Figure 1:
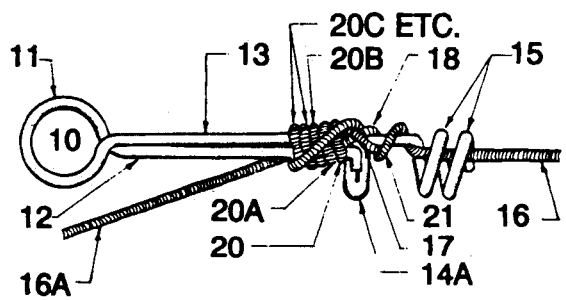
FIG. 1 is a side elevation view of a first embodiment of the invention.
Figure 1A:
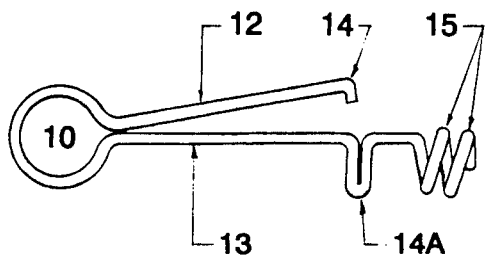
FIG. 1A shows a side elevation of the first embodiment of the invention without the fishing line.

Referring now to the drawing:

In the illustrated preferred embodiments, the first embodiment of the improved quick tie device includes a body shown generally at Structure 10 in FIGS. 1 and 1A. As shown, the quick tie device is advantageously made from a length of preferably a rustproof spring wire that is bent to form a loop 11 with two shanks 12 and 13 extending from the loop. Shank 12 is used primarily to insert the quick tie device into or through the eye of a hook, lure, fly, etc., after which it is locked in a closed position by extending the end of the shank 12 under and around post 14A. The end of shank 12 is bent at substantially 90 degrees to form a line stopper to preclude loop 11 from straightening out as from a strong pull of a heavy fish. The end of shank 13 is wound into a helix 15 having approximately 2 ½turns. Shank 13 has a closed "U" snubbing post 14A adjacent post 14 of shank 12.

A fishing line or strand material 16 has an end section 16A which is held with the left hand, together with the quick tie device 10 as viewed in FIG. 1, to the left or back of post 14A. The line 16 is brought adjacent to post 14A and is wound with the right hand around the shanks 12 and 13 at the left or back of post 14A to form loop 17, and a portion of 18 of the line 16 is then wrapped around shank 13 at the right or front of the post 14A to form a loop 18. Line 16 is then carried around post 14A as shown at 20 and additional loops 20A, 20B, 20C, etc.—being wrapped contiguously behind post 14A and around shanks 12 and 13 and over the loop 17. Line 16 is then continued forward—overlapping previous loops—towards the right, and past post 14A around shank 13 to form loop 21 and then is wrapped between the turns of the helix which self threads the line through the center of the Helix 15.

An alternate embodiment shown as Structure 30, FIG. 2, shows the quick tie device with a helix on each end, 31 and 32 and the post 14A in the middle. This embodiment permits two lines to be attached end to end or used on the end of a snell 37—attached to hook 36—in place of the conventional loop. This is stronger than the loop knot. Its use is shown in FIG. 3.

FIGS. 4 and 4A show components of an alternate embodiment being used in the making of an artificial fishing fly. Shank 13 is cut about four snubbing post lengths rearward from said post and a small stopper post is formed on the end of shank 13. The structure is then attached by solder or cement on an eyeless hook or a hook with the eye removed, 35.

FIG. 5 depicts loop 11 and shank 12 being modified by shortening Shank 12 and forming a small upturn at the end of the shortened member and the straight portion of Shank 12 being in contact with the straight section of Shank 13.

FIGS. 6 and 6A show alternate forms of the invention, being used as foundations for teaser streamer flies. Such a streamer fly is shown in FIG. 7, attached on the line ahead of an action lure. Note that a hook is attached to Loop 11.

I claim:

1. A quick tie link and fishing device for providing a knotless non-slip wrapping for a flexible line on said fishing device comprising, an elongated form made from a single piece of wire material having a helix at one end of said elongate form connected to a closed "U" snubbing post that is formed at a substantially 90 degree angle to said elongate form; said snubbing post being located a distance from the helix approximately equal to the height of said snubbing post, the diameter of said helix being approximately equal to the height of said snubbing post; a first straight shank portion which extends from said snubbing post to a loop;

a second shank connected to said loop, said second shank being substantially parallel to said first shank portion and second shank extends from said loop to said snubbing post where said second shank terminates in a post which is perpendicular to said second shank.

* * * * *

UNITED STATES PATENT AND TRADEMARK OFFICE
CERTIFICATE OF CORRECTION

PATENT NO. : 5,009,025
DATED : APRIL 23,1991
INVENTOR(S) : GROVER R. AUSTAD

It is certified that error appears in the above-identified patent and that said Letters Patent is hereby corrected as shown below:

Column 1, lines 13-23, should read as follows:

The common method of attaching a lure, hook fly, swivel or other fishing device to a fishing line or leader is the conventional knot. Today, as in the past, the fishing devices are tied to the line and when it is necessary to remove the device the line is cut. A certain skill is required to properly tie a knot that will not release and even an experienced fisherman will require more time in

UNITED STATES PATENT AND TRADEMARK OFFICE
CERTIFICATE OF CORRECTION

PATENT NO. : 5,009,025  
DATED : April 23, 1991  
INVENTOR(S) : Grover R. Austad Page 2 of 2

It is certified that error appears in the above-indentified patent and that said Letters Patent is hereby corrected as shown below:

tying a device to a line than he desires. Some people, because of advancing age or infirmities may not be able to tie the <u>knots</u> required, and as a result must rely on others or give up the great sport of fishing.

Signed and Sealed this

Third Day of August, 1993

Attest:

MICHAEL K. KIRK

*Attesting Officer*     *Acting Commissioner of Patents and Trademarks*